United States Patent [19]
Alameh et al.

[11] Patent Number: 5,490,175
[45] Date of Patent: Feb. 6, 1996

[54] METHOD AND APPARATUS FOR DETECTING BINARY ENCODED DATA

[75] Inventors: Rachid M. Alameh, Schaumburg; Bruce C. Eastmond, Downers Grove, both of Ill.

[73] Assignee: Motorola, Inc., Schaumburg, Ill.

[21] Appl. No.: 42,910

[22] Filed: Apr. 5, 1993

[51] Int. Cl.⁶ .................................................. H04L 25/06
[52] U.S. Cl. .............................. 375/317; 375/340; 371/6
[58] Field of Search ................................. 375/75, 76, 94, 375/95; 371/6

[56] References Cited

U.S. PATENT DOCUMENTS

| | | | |
|---|---|---|---|
| 3,303,425 | 4/1963 | Pendleton | 375/76 |
| 3,409,833 | 11/1968 | Dalton | 375/76 |
| 4,080,572 | 3/1978 | Hastings et al. | 375/95 |
| 4,307,465 | 12/1981 | Geller | 375/76 |
| 4,370,748 | 1/1983 | Janc et al. | 375/95 |
| 4,783,658 | 11/1988 | Nakano et al. | 375/76 |

FOREIGN PATENT DOCUMENTS 4037233  2/1992  Japan ........................................ 375/76

*Primary Examiner*—Stephen Chin
*Assistant Examiner*—T. Ghebretinsae
*Attorney, Agent, or Firm*—Timothy W. Markison; Nedra D. Karim

[57] ABSTRACT

Binary encoded data may be detected in a stream of data, by first detecting data transitions. From the detected data transitions, a first pulse is generated when successive data transitions are detected within a predetermined period of time and a second pulse is generated when successive data transitions are not detected within the predetermined period of time. The first and second pulses have the same duration but the amplitude of the first pulses is half of the amplitude of the second pulses. The first and second pulses are filtered by a bandpass filter and compared with a predetermined threshold. When the filtered pulses are above the predetermined threshold, the received stream of data is binary encoded data. When the filtered pulses are below the predetermined threshold, the received stream of data is not binary encoded data.

17 Claims, 3 Drawing Sheets

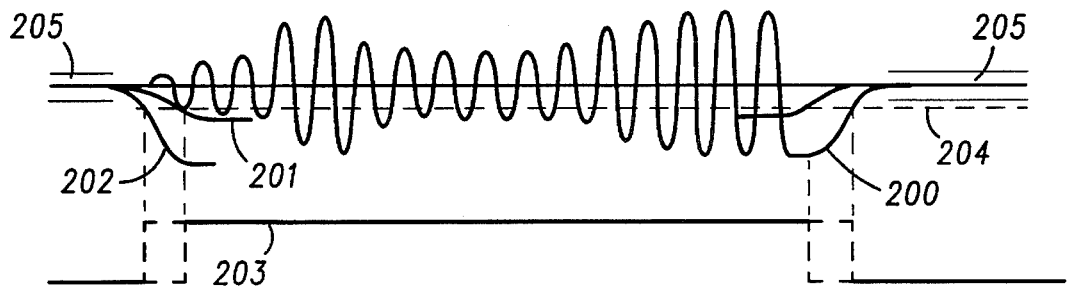
FIG.2
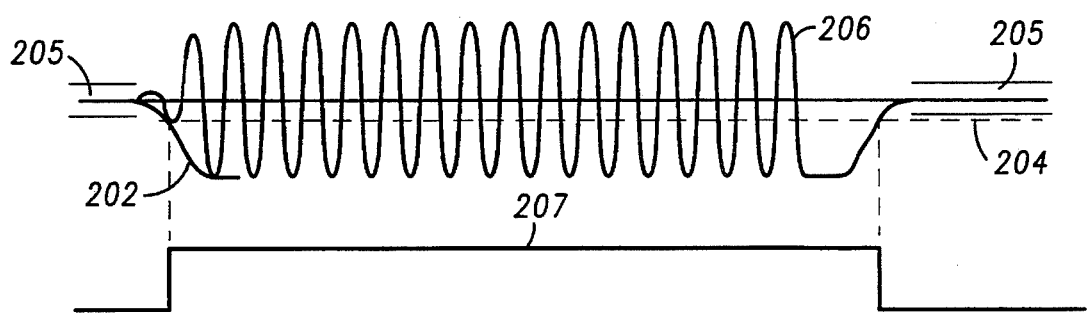
FIG.4
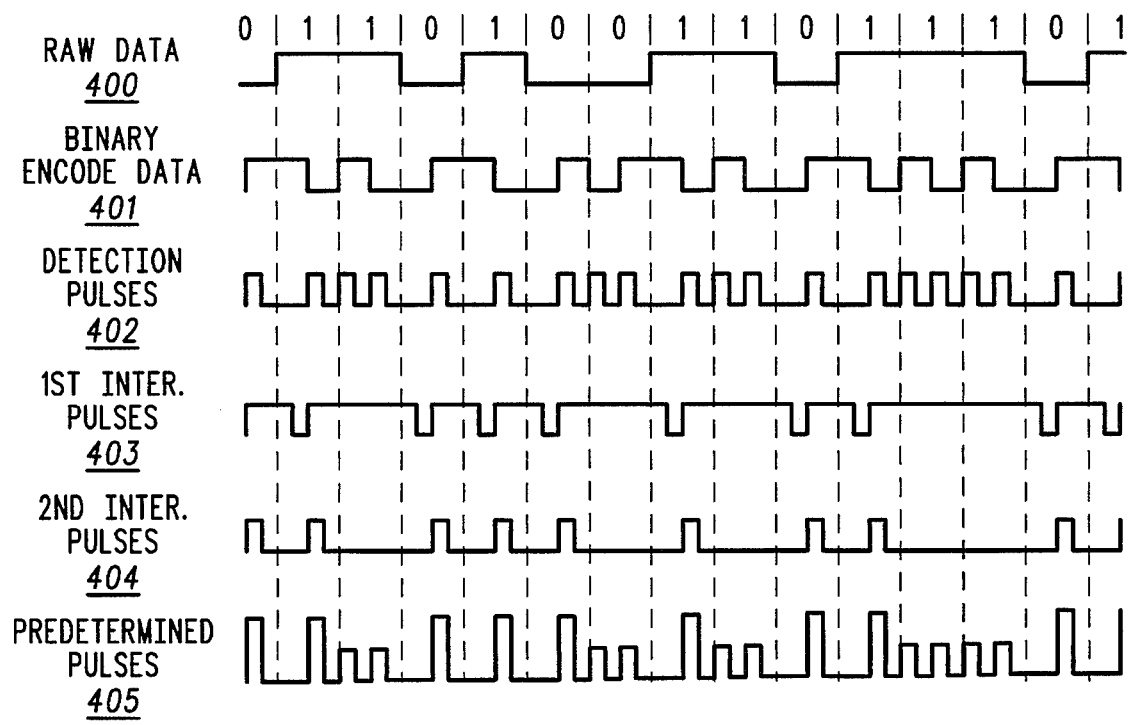

METHOD AND APPARATUS FOR DETECTING BINARY ENCODED DATA

FIELD OF THE INVENTION

This invention relates generally to binary encoded data and, in particular, to detection of received binary encoded data.

BACKGROUND OF THE INVENTION

As is known, communication links which utilize packet data formats, such as 10 Mbps Ethernet, and baseband binary encoding formats such as Manchester or delay modulation (also known as Miller coding) commonly employ receivers with amplitude limiting. Direct detection optical receivers with ac-coupled baseband limiting are commonly used for wireless data communication due to their low cost and simplicity. However, full-swing noise is present at the output of these receivers between data packet transmissions. In LAN (local area network) systems using a CSMA/CD (Carrier Sense Multiple Access with Collision Detection) protocol, such as Ethernet, interpacket noise may be misinterpreted as a collision, i.e. multiple sources transmitting on the LAN at the same time. To avoid misinterpretation of noise, it is necessary to distinguish between signal and noise. This is typically accomplished by a signal presence indicator (SPI) which squelches the output of the receiver between packet transmissions.

Various types of SPIs are known in the art. For example, one SPI commonly used in direct detection optical fiber receivers compares the received signal amplitude to a fixed threshold. While this approach works in many instances, it is not suitable for wireless optical receivers since an increase in the intensity of ambient background radiation due to daylight, incandescent lamps, or nearby optical transmitters in the same system may produce a false indication of signal presence. To avoid this problem, it is necessary to continuously monitor the background noise level and adjust the threshold level to ensure proper operation without false indications. Since the level of the background noise varies widely, a logarithmic receiver would be necessary to ensure adequate dynamic range, which is cost prohibitive.

Therefore, a need exists for a signal presence indicator for direct-detection wireless optical data amplitude limiting receivers.

BRIEF DESCRIPTION OF THE DRAWINGS

FIG. 2 illustrates the output of a bandpass filter and the corresponding gating signal before and after pre-distortion in accordance with the present invention.

FIG. 4 illustrates a timing diagram of data at different stages from raw data to predetermined pulses in accordance with the present invention.

DESCRIPTION OF A PREFERRED EMBODIMENT

Generally, the present invention provides a method and apparatus which detect when a stream of binary encoded data contains valid binary encoded data. This is accomplished by receiving the stream of binary encoded data (data stream) and generating a fixed duration pulse whenever a data transition (rising or falling edge) is detected within the data stream. Having generated the fixed duration pulses, the present invention determines whether consecutive pulses occurred within a predetermined period of time. If consecutive pulses occurred within the predetermined period of time, a first pulse is generated for the consecutive pulses, wherein the first pulses have the same duration as the consecutive pulses and a first amplitude. If the consecutive pulses did not occur within the predetermined period of time, a second pulse is generated for the consecutive pulses, wherein the second pulses have the same duration as the consecutive pulses and a second amplitude which is twice the first amplitude. The first and second pulses are combined into a pulse train and filtered by a tuned filter, where the tuned filter is tuned to twice the bit rate of the binary encoded data.

When valid binary encoded data is applied to the present invention, the pulse train of first and second pulses will have a frequency of twice the bit rate for the first pulses and the bit rate for the second pulses. With such frequencies and the two-to-one difference in amplitudes, the first pulses and the second pulses will excite the tuned filter in the same manner resulting in a sinusoidal output that exceeds a predetermined threshold, thus indicating valid binary encoded data. When invalid binary encoded data is applied to the present invention, the pulse train of first and second pulses will have varying frequencies, which, when applied to the tuned filter, will not excite the tuned filter in the same manner. As a result, a non-sinusiodal output is produced which does not exceed the predetermined threshold, thus indicating invalid data.

Figure 1:
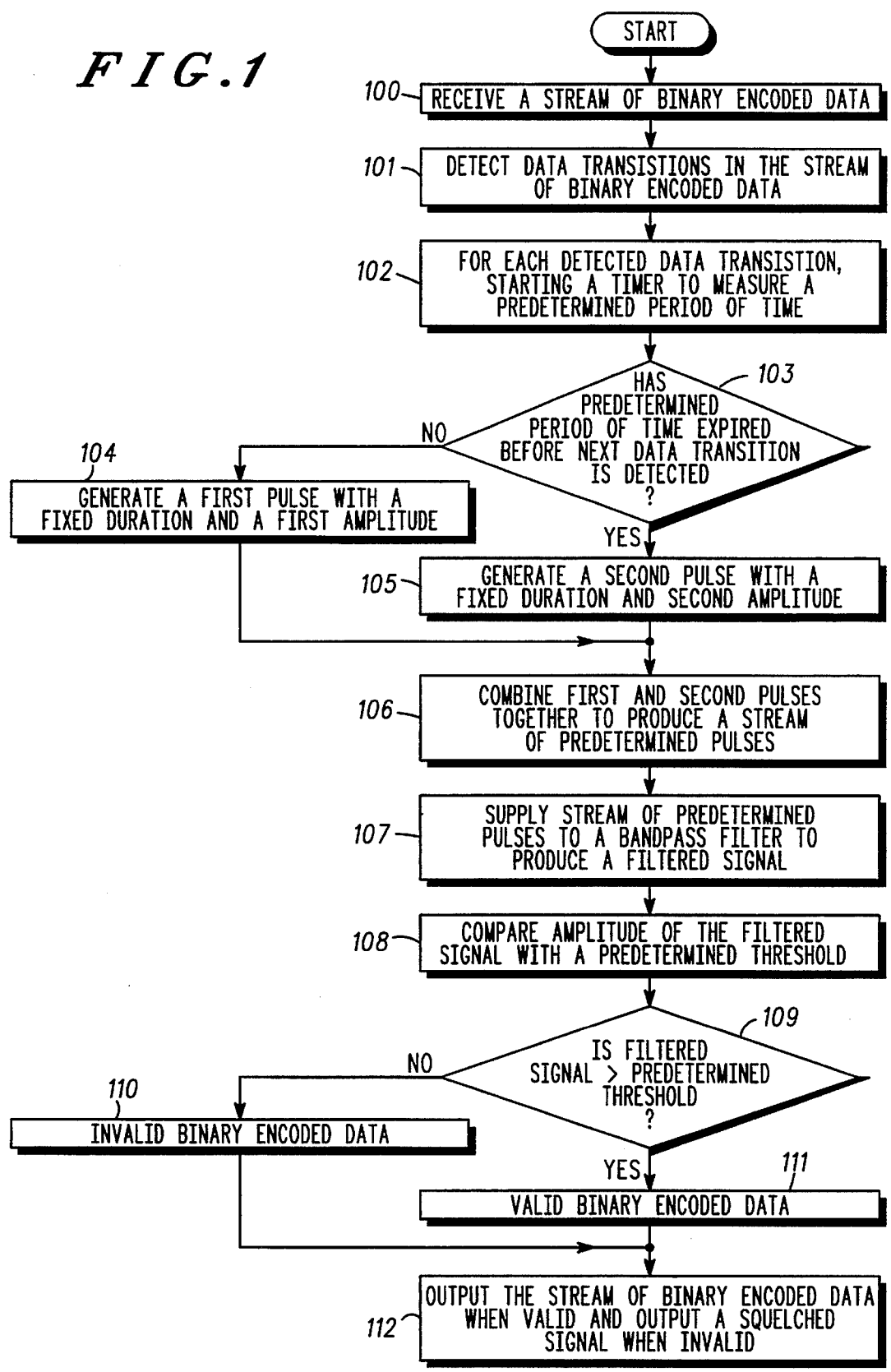
FIG. 1 illustrates a logic diagram that may be implemented in software or discrete logic in accordance with the present invention.

The present invention can be more fully described with reference to FIGS. 1–4. FIG. 1 illustrates a flow diagram of a first embodiment of the present invention which may be implemented in software or discrete logic devices. The present invention may be used in a PC (personal computer), such as an IBM PC XT, that includes a receiver that receives infrared transmitted binary encoded optical data packets. At step 100, an IR receiver receives binary encoded data. The binary encoded data may be Manchester encoded data, Miller encoded data, etc. For purposes of this discussion, Manchester encoded data will be used. From the received binary encoded data a fixed-duration detection pulse is generated (101) from the leading and trailing edges of the received binary encoded data to produce a stream of detection pulses. Each detection pulse duration is set to one fourth the Manchester bit period or 25 nanoseconds in the case of Ethernet data. This results in a 20 MHz square wave signal when the Manchester encoded data comprises an all ones or an all zeros sequence; a 10 MHz 25% duty cycle rectangular wave signal when the encoded data contains an alternating ones and zeros sequence, and a combination of the two when receiving random Manchester encoded data. The one fourth bit duration was chosen because it provides the largest spectral energy at the 20 MHz central passband frequency for both the 10 MHz rectangular wave and the 20 MHz square wave signals.

For each data transition in the fixed duration detection pulse stream, a timer is started to measure a predetermined period of time (102). The predetermined period of time may range from 50% to 90% of the minimum rate of the binary encoded data. For Manchester encoded data the range will be from 50 ns to 90 ns. In the case of Ethernet data, the predetermined period of time is set to three quarters of a bit or 75 nanoseconds. If a data transition occurs before the predetermined period of time expires (103), indicating all ones or all zeros sequences, a first pulse with a fixed duration and a first amplitude is generated (104). If the predetermined period of time expires before the next data transition is detected (103), indicating alternating data sequences, a second pulse with a fixed duration and a second amplitude is generated (105).

The first and second pulses are combined to produce a stream of predetermined pulses (106). The resulting amplitude-varying stream of predetermined pulses is applied to a bandpass filter, to separate the signal from the noise, producing a filtered signal (107). The bandpass filter may be based on a tuned resonance wherein the resonant frequency is centered at twice the data rate, such as 20 MHz for Ethernet data. The filter may also be based on a synchronous detection phase-locked loop wherein the phase-locked loop is locked to twice the data rate, such as 20 MHz for Ethernet data.

The amplitude of the filtered signal is compared with a predetermined threshold (108) set between the noise and the maximum signal levels. Ideally, the predetermined threshold is set as close as possible to the noise level, to allow for the fastest response indication. If the amplitude of the filtered signal is less than the predetermined threshold (109), the filtered signal is determined to be invalid binary encoded data (110). If the amplitude of the filtered signal is greater than the predetermined threshold (109), the filtered signal is determined to be valid binary encoded data (111). When the filtered signal indicates valid binary encoded data, the binary encoded data is outputted (112). When the filtered signal does not indicate valid binary encoded data, the output is squelched (112).

FIG. 2 represents a waveform description of the problem being resolved by the present invention. FIG. 2 depicts the output (200) of the bandpass filter and the corresponding gating signal (203) if steps 102–106 of FIG. 1 were not performed. The output (200) exhibits a 2:1 amplitude variation due to the 20 MHz rate (50% duty cycle) for non-alternating data and a 10 MHz rate (25% duty cycle) for alternating data. The amplitude varying sine wave is then compared to a fixed threshold (204) which is set between the minimum signal amplitude (200) and the noise level (205). Because of the amplitude variation, the filter exhibits varying response time curves (201 and 202). The intersection of these curves with the pre-determined threshold line (204) produces different signal indication response times as shown in the dashed lines at the beginning and end of the resulting gating signal (203). After applying steps 102–106, the filter's output (206) displays a constant amplitude sine wave with a rapid and single response curve (202). The resulting gating signal (207) exhibits a consistent and rapid indication of the valid binary encoded data.

Figure 3:
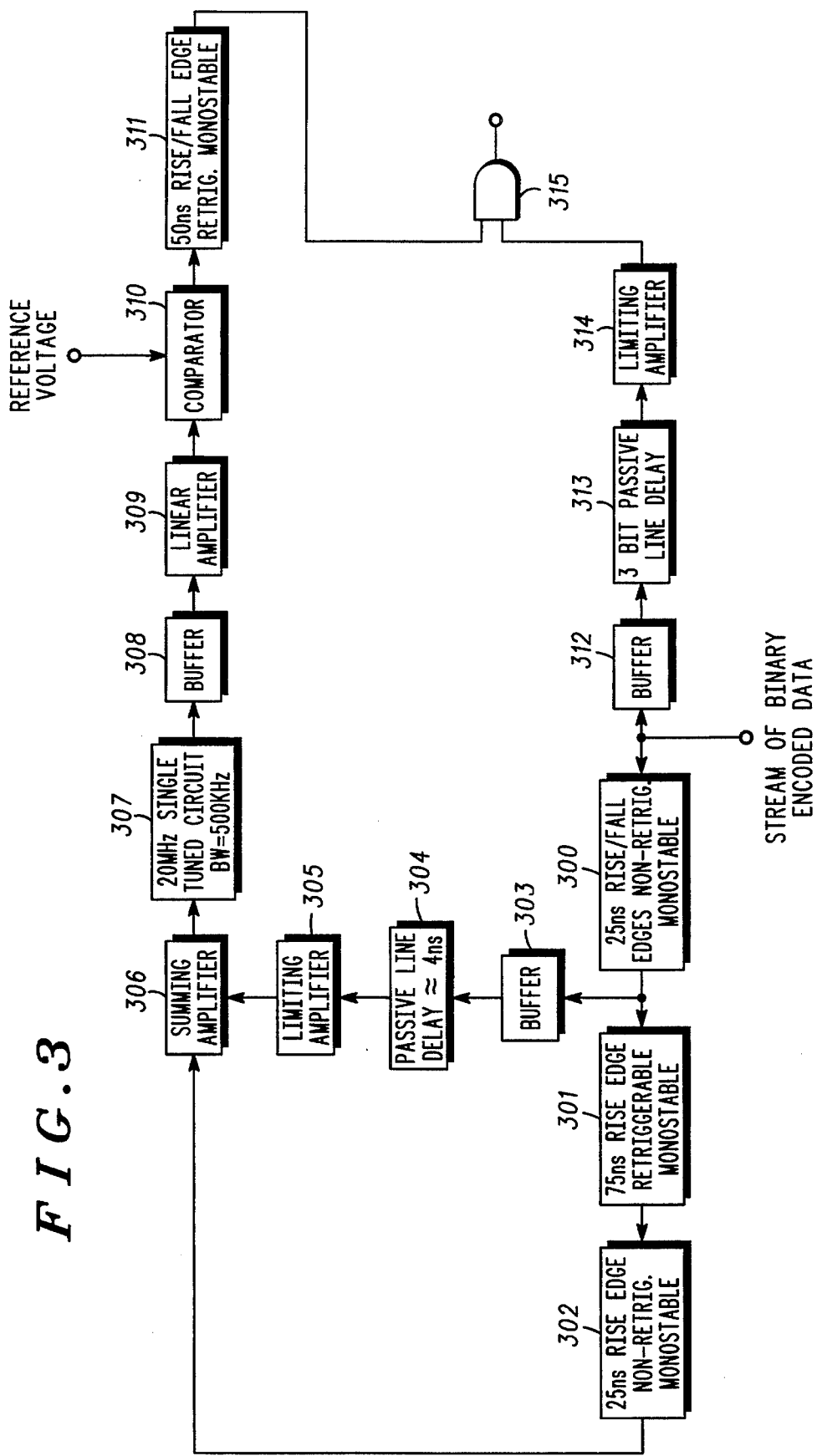
FIG. 3 illustrates a block diagram that may be implemented with discrete logic in accordance with the present invention.

FIG. 4 illustrates a timing diagram for a second embodiment, which contains a sequence of waveforms illustrating representative signal waveforms at indicated portions of FIG. 3. The operation of the circuit of FIG. 3 is more easily understood by referring at the same time to the timing diagram of FIG. 4. Raw data (400) is transformed to binary encoded data (401) using a Manchester encoding format. The stream of detection pulses (402) is generated using a 25 nanoseconds first non-retriggerable ECL monostable multivibrator (300) that responds to the rising and falling edges of the incoming Manchester encoded data.

The timer, which establishes the predetermined period of time, is implemented using a 75 nanoseconds retriggerable ECL monostable gate (301) acting on the rising edge transitions of the incoming stream of detection pulses (402). This results in first intermediate pulses (403). A stream of second intermediate pulses (404) is generated using a second 25 nanoseconds non-retriggerable ECL monostable gate (302) that responds to the rising edge transitions of the incoming first intermediate pulses (403). The stream of second intermediate pulses (404) is then linearly added by a summer (306) to the stream of detection pulses (402) resulting in a stream of predetermined pulses (405). Note that buffer (303), passive line delay (304) and limiting amplifier (305) are utilized to ensure that the stream of detection pulses is in phase with the stream of second intermediate pulses prior to the linear addition of the two. Linear addition is an important characteristic of the pre-distortion implementation because it minimizes the increase in the no-signal noise level. This is because the doubling in the pulse amplitude, in the case of Ethernet data, occurs only when the stream of second intermediate pulses (404) and the stream of detection pulses (402) are in phase.

The summer (306) output (405) is applied to the input of a 20 MHz tuned resonance circuit (307) which separates noise from the signal. The output of the filter is then applied to a buffer (308), a gain stage (309), and a fast comparator (310) with a fixed threshold set slightly above the noise floor. This is followed by a 50 nanoseconds rise and fall edge retriggerable monostable gate (311) used to transform the comparator output signal into a continuous indication of the presence of binary encoded data (207).

The last step in the gating operation is to use the generated data indication signal in the squelching of the interpacket noise. This is accomplished by a dual input AND gate (315) with one input connected to the gating signal and the other to a delayed version of the Manchester data in order to compensate for the time spent in generating the gating signal. The delayed version of the Manchester data is accomplished with buffer (312), passive line delay (313), and limiting amplifier (314).

The present invention provides a Signal Presence Indicator (SPI) design configuration suitable to wireless IR communications with consistent response time to Manchester encoded data. With such a design the present invention substantially eliminates, in LAN systems such as 10 Mbps Ethernet, interpacket noise being mis-interpreted as signal collisions.

We claim:

1. A method for detecting binary encoded data, the method comprises the steps of:

a) receiving a stream of binary encoded data to produce a received stream of data;

b) detecting data transitions in the received stream of data to produce detected data transitions;

c) for each detected data transition;
      generating a first pulse having a fixed duration and a first amplitude when successive detected data transitions are detected within a predetermined period of time;
      generating a second pulse having the fixed duration and a second amplitude when the successive detected data transitions are not detected within the predetermined period of time; and
      combining the first and second pulses to produce a stream of predetermined pulses;

d) supplying the stream of predetermined pulses to a bandpass filter;

e) filtering, by the bandpass filter, the stream of predetermined pulses to produce a filtered signal;

f) comparing the filtered signal with a predetermined threshold; and g) when the filtered signal is above the predetermined threshold, indicating that the received stream of data is valid binary encoded data and when the filtered signal is below the predetermined threshold, indicating that the received stream of data is not valid binary encoded data.

2. In the method of claim 1 step (e) further comprises filtering by the bandpass filter, the stream of predetermined pulses based on a tuned resonance, wherein resonant frequency of the bandpass filter is based on frequency of the stream of predetermined pulses.

3. In the method of claim 1 step (e) further comprises filtering by the bandpass filter, the stream of predetermined pulses based on a synchronous detection phase-locked loop.

4. The method of claim 1 further comprises:

h) outputting the valid binary encoded data when the filtered signal indicates that the received stream of data is valid binary encoded data and squelching the received stream of data when the filtered signal indicates that the received stream of data is not valid binary encoded data.

5. A method for detecting binary encoded data, the method comprises the steps of:

a) receiving a stream of binary encoded data to produce a received stream of data;

b) detecting data transitions in the received stream of data to produce detected data transitions;

c) for each detected data transition, generating a decryption pulse of a fixed detection duration to produce a stream of detection pulses;

d) from each detection pulse in the stream of detection pulses, generating a first intermediate pulse having a first intermediate fixed duration, wherein the first intermediate fixed duration is larger than the fixed detection duration and is in the range of one half of the minimum rate of the binary encoded data to ninety percent of the minimum rate of the binary encoded data;

e) from each first intermediate pulse, generating a second intermediate pulse having the fixed detection duration to produce a stream of second intermediate pulses;

f) summing the stream of second intermediate pulses with the stream of detection pulses to produce a stream of predetermined pulses;

g) supplying the stream of predetermined pulses to a bandpass filter;

h) filtering, by the bandpass filter, the stream of predetermined pulses to produce a filtered signal;

i) comparing the filtered signal with a predetermined threshold; and j) when the filtered signal is above the predetermined threshold, indicating that the received stream of data is valid binary encoded data and when the filtered signal is below the predetermined threshold, indicating that the received stream of data is not valid binary encoded data.

6. In the method of claim 5 step (h) further comprises filtering by the bandpass filter, the stream of predetermined pulses based on a tuned resonance, wherein resonant frequency of the bandpass filter is based on frequency of the stream of predetermined pulses.

7. In the method of claim 5 step (h) further comprises filtering by the bandpass filter, the stream of predetermined pulses based on a synchronous detection phase-locked loop.

8. The method of claim 5 further comprises:

k) outputting the valid binary encoded data when the filtered signal indicates that the received stream of data is valid binary encoded data and squelching the received stream of data when the filtered signal indicates that the received stream of data is not valid binary encoded data.

9. In a personal computer that includes a receiver that receives infrared transmitted binary encoded optical data packets, a method for detecting the binary encoded optical data packets, the method comprises the steps of:

a) receiving a stream of binary encoded data to produce a received stream of data;

b) detecting data transitions in the received stream of data to produce detected data transitions;

c) for each detected data transition;

generating a first pulse having a fixed duration and a first amplitude when successive detected data transitions are detected within a predetermined period of time;

generating a second pulse having the fixed duration and a second amplitude when the successive detected data transitions are not detected within the predetermined period of time; and combining the first and second pulses to produce a stream of predetermined pulses;

d) supplying the stream of predetermined pulses to a bandpass filter;

e) filtering, by the bandpass filter, the stream of predetermined pulses to produce a filtered signal;

f) comparing the filtered signal with a predetermined threshold; and g) when the filtered signal is above the predetermined threshold, indicating that the received stream of data is valid binary encoded data and when the filtered signal is below the predetermined threshold, indicating that the received stream is data is not valid binary encoded data.

10. In the method of claim 9 step (e) further comprises filtering by the bandpass filter, the stream of predetermined pulses based on a tuned resonance, wherein resonant frequency of the bandpass filter is based on frequency of the stream of predetermined pulses.

11. In the method of claim 9 step (e) further comprises filtering by the bandpass filter, the stream of predetermined pulses based on a synchronous detection phase-locked loop.

12. The method of claim 9 further comprises:

h) outputting the valid binary encoded data when the filtered signal indicates that the received stream of data is valid binary encoded data and squelching the received stream of data when the filtered signal indicates that the received stream of data is not valid binary encoded data.

13. In a personal computer that includes a receiver that receives infrared transmitted binary encoded optical data packets, a method for detecting binary encoded optical data packets, the method comprises the steps of:

a) receiving a stream of binary encoded data to produce a received stream of data;

b) detecting data transitions in the received stream of data to produce detected data transitions;

c) for each detected data transition, generating a detection pulse of a fixed detection duration to produce a stream of detection pulses;

d) from each detection pulse in the stream of detection pulses, generating a first intermediate pulse having a first intermediate fixed duration, wherein the first intermediate fixed duration is larger than the fixed detection duration and is in the range of one half of the minimum rate of the binary encoded data to ninety percent of the minimum rate of the binary encoded data;

e) from each first intermediate pulse, generating a second intermediate pulse having the fixed detection duration to produce a stream of second intermediate pulses;

f) summing the stream of second intermediate pulses with the stream of detection pulses to produce a stream of predetermined pulses;

g) supplying the stream of predetermined pulses to a bandpass filter;

h) filtering, by the bandpass filter, the stream of predetermined pulses to produce a filtered signal;

i) comparing the filtered signal with a predetermined threshold; and j) when the filtered signal is above the predetermined threshold, indicating that the received stream of data is valid binary encoded data and when the filtered signal is below the predetermined threshold, indicating that the received stream of data is not valid binary encoded data.

14. In the method of claim 13 step (h) further comprises filtering by the bandpass filter, the stream of predetermined pulses based on a tuned resonance, wherein resonant frequency of the bandpass filter is based on frequency of the stream of predetermined pulses.

15. In the method of claim 13 step (h) further comprises filtering by the bandpass filter, the stream of predetermined pulses based on a synchronous detection phase-locked loop.

16. The method of claim 13 further comprises:

k) outputting the valid binary encoded data when the filtered signal indicates that the received stream of data is valid binary encoded data and squelching the received stream of data when the filtered signal indicates that the received stream of data is not valid binary encoded data.

17. An apparatus for detecting when a stream of data includes valid binary encode data, the apparatus comprises:

a receiver, wherein the receiver receives the stream of data to produce a received stream of data;

a first non-retriggerable pulse generator that is triggered by data transitions in the received stream of data, wherein the first non-retriggerable pulse generator produces a stream of detection pulses having a fixed duration and a first amplitude;

a retriggerable pulse generator that is triggered by the stream of detection pulses, wherein the retriggerable pulse generator produces a stream of first intermediate pulses having a first intermediate duration;

a second non-retriggerable pulse generator that is triggered by the stream of first intermediate pulses, wherein the second non-retriggerable pulse generator produces a stream of second intermediate pulses having the fixed duration and the first amplitude;

a summer, wherein the summer sums the stream of detection pulses with the stream of second intermediate pulses to produce a pre-distorted stream of pulses;

a tuned filter, wherein the tuned filter filters the pre-distorted stream of pulses to produce a filtered signal; and a comparator, wherein the comparator compares the filtered signal with a predetermined threshold, such that when the filtered signal is less than the predetermined threshold, the stream of data contains invalid binary encoded data, and, when the filtered signal is greater than the predetermined threshold, the stream of data contains valid binary encoded data.

* * * * *